US012145380B2

(12) United States Patent
Gaya Pol et al.

(10) Patent No.: US 12,145,380 B2
(45) Date of Patent: Nov. 19, 2024

(54) MODULAR PRINTER CARRIAGE

(71) Applicant: Hewlett-Packard Development Company, L.P., Spring, TX (US)

(72) Inventors: Bartomeu Gaya Pol, Sant Cugat del Valles (ES); Jeffrey L. Thielman, Sant Cugat del Valles (ES); Oscar Orozco, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 330 days.

(21) Appl. No.: 17/639,780

(22) PCT Filed: Oct. 11, 2019

(86) PCT No.: PCT/US2019/055938

§ 371 (c)(1),
(2) Date: Mar. 2, 2022

(87) PCT Pub. No.: WO2021/071521

PCT Pub. Date: Apr. 15, 2021

(65) Prior Publication Data

US 2022/0288959 A1 Sep. 15, 2022

(51) Int. Cl.

*B41J 25/34* (2006.01)
*B41J 2/175* (2006.01)
*B41J 1/24* (2006.01)

(52) U.S. Cl.

CPC ............ *B41J 25/34* (2013.01); *B41J 2/1752* (2013.01); *B41J 1/243* (2013.01); *B41J 1/246* (2013.01); *B41J 2202/14* (2013.01); *B41J 2202/20* (2013.01)

(58) Field of Classification Search

CPC . B41J 25/34; B41J 2/1752; B41J 1/243; B41J 1/246; B41J 2202/14; B41J 2202/20; B41J 25/308

See application file for complete search history.

(56) References Cited

U.S. PATENT DOCUMENTS

| | | | | |
|---|---|---|---|---|
| 5,539,436 | A | 7/1996 | Wilson | |
| 6,065,826 | A | 5/2000 | Robinson et al. | |
| 8,967,769 | B1 * | 3/2015 | Dowell | B41J 2/155 347/40 |
| 9,259,931 | B2 * | 2/2016 | Moreau | B41J 2/04505 |
| 9,522,526 | B1 * | 12/2016 | Aiba | B41J 2/14233 |
| 2004/0090488 | A1 | 5/2004 | Nellen | |
| 2009/0295866 | A1 * | 12/2009 | Ray | B41J 25/34 347/40 |

(Continued)

FOREIGN PATENT DOCUMENTS

| | | | |
|---|---|---|---|
| CN | 1274496 | C | 9/2006 |
| CN | 208438899 | U | 1/2019 |

(Continued)

*Primary Examiner* — Henok D Legesse
(74) *Attorney, Agent, or Firm* — Jordan IP Law, LLC

(57) ABSTRACT

A method of manufacturing a printer carriage comprises providing a printhead carrier component to receive a plurality of printheads according to a predefined printhead layout, providing a frame component, and attaching the printhead carrier component to the frame component. The printhead carrier component and the frame component are distinct components, which can be separately manufactured.

15 Claims, 5 Drawing Sheets

(56) References Cited

U.S. PATENT DOCUMENTS

| | | | | |
|---|---|---|---|---|
| 2012/0113182 | A1 | 5/2012 | Sturm et al. | |
| 2013/0021410 | A1 | 1/2013 | Navon et al. | |
| 2019/0217616 | A1 | 7/2019 | Mu et al. | |
| 2021/0252859 | A1 * | 8/2021 | Cumbie | B41J 2/1433 |

FOREIGN PATENT DOCUMENTS

| | | | |
|---|---|---|---|
| CN | 109986884 | A | 7/2019 |
| DE | 19511416 | A1 | 11/1995 |
| EP | 0659573 | A2 | 6/1995 |
| JP | 08-104043 | A | 4/1996 |
| JP | 2001113722 | | 4/2001 |
| JP | 2001-277658 | A | 10/2001 |
| JP | 2005-022199 | A | 1/2005 |
| WO | 91/04865 | A1 | 4/1991 |
| WO | 2016/160080 | A1 | 10/2016 |

* cited by examiner

MODULAR PRINTER CARRIAGE

BACKGROUND

Different printing devices require different printhead layouts, for example different numbers of printheads, different printhead positioning, different printhead to paper distances or different carriage rod to printhead distances. Manufacturing flexibility is limited due to the high costs related to the process of modifying an existing manufacturing line for producing printing devices with a new printhead layout.

BRIEF DESCRIPTION OF THE FIGURES

FIG. 2*a*) represents a top view, FIG. 2*b*) represents a front view and FIG. 2*c*) represents a perspective view.

FIGS. 3*a*) to 3*d*) respectively represent different printhead layouts according to corresponding examples.

FIG. 4*a*) represents a front view, FIG. 4*b*) represents a front view and FIG. 4*c*) represents a perspective view.

FIG. 5*a*) represents a bottom cross-sectional view and FIG. 5*b*) represents a front view.

DETAILED DESCRIPTION

Figure 1:
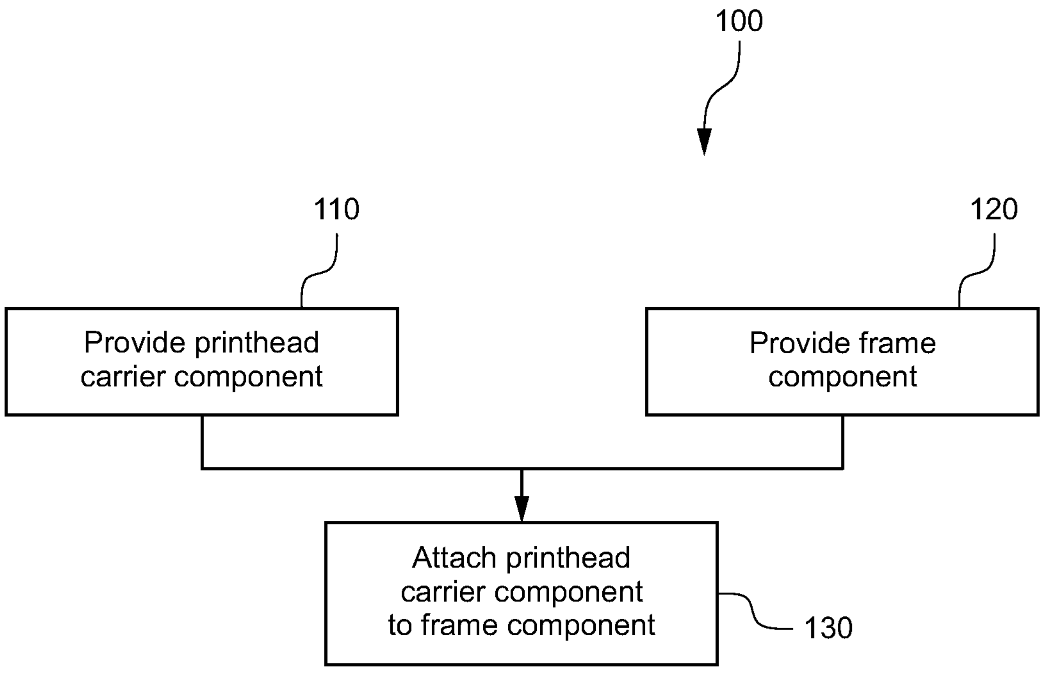
FIG. 1 is a flow diagram schematically illustrating a method according to an example.
Figure 2:
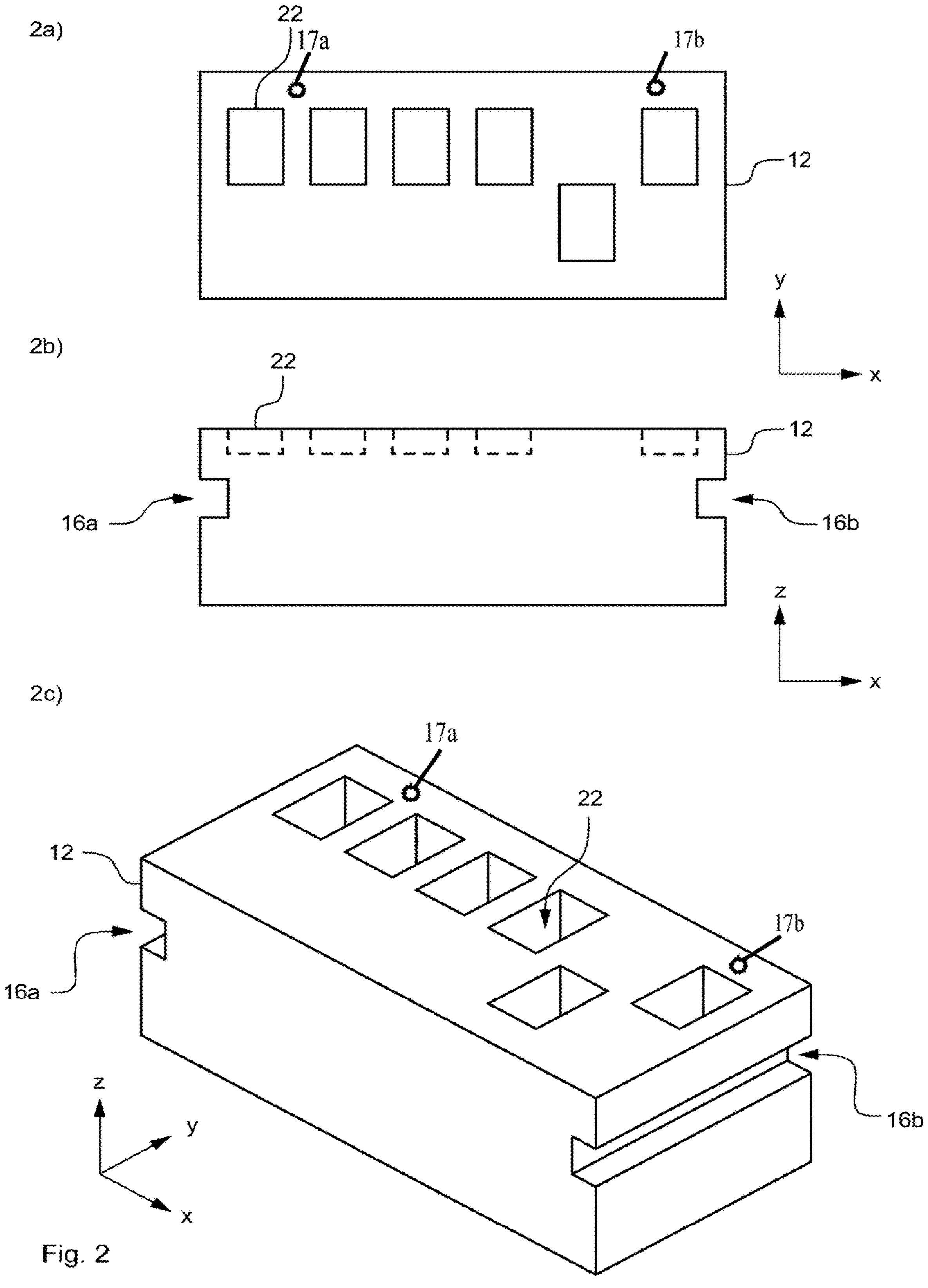
FIG. 2 is a schematic illustration of a printhead carrier component according to an example.

FIG. 1 is a schematic flow diagram representing a method of manufacturing a printer carriage according to an example. The method 100 comprises providing, at no, a printhead carrier component. A printhead carrier component 12 according to an example is schematically illustrated in FIG. 2, wherein FIGS. 2*a*), 2*b*) and 2*c*) respectively illustrate a top view in the XY-plane, a front view in the XL-plane and a perspective view of the printhead carrier component 12. In some examples, the X direction may correspond to a carriage scanning direction, i.e. a direction in which the printer carriage may be movable to scan a print medium; the Y direction may correspond to a print medium advance direction in a printer environment, and the Z direction may correspond to the vertical direction.

The printhead carrier component 12 includes a plurality of bays 22 to receive a corresponding plurality of printheads. The plurality of bays 22 may be arranged according to a predetermined printhead layout. As schematically illustrated in FIGS. 2*a*) and 2*c*), the printhead carrier component 12 includes six bays 22, wherein some of the bays 22 (in the example shown, five) are aligned with each other, for example in the Y-direction, whereas some other of the bays 22 (in the example shown, one) is/are offset with respect to the other bays, for example in the Y-direction. In other examples, the printhead carrier component 12, may comprise any number of bays 22 larger or smaller than six to receive a corresponding number of printheads. For example, the printhead carrier component 12 may comprise 1, 2, 3, 4, 6, 8 or 10 bays to receive printheads. In certain configurations, some bays also may remain empty.

The printhead carrier component 12 may be 3D-printed, machined or molded. In some examples, the printhead carrier component 12 may be monolithic. Thus, it may be possible to provide or form the printhead carrier component 12 in a single manufacturing operation, for example in a single molding process using a corresponding mold or in a single 3-D printing process.

Figure 3:
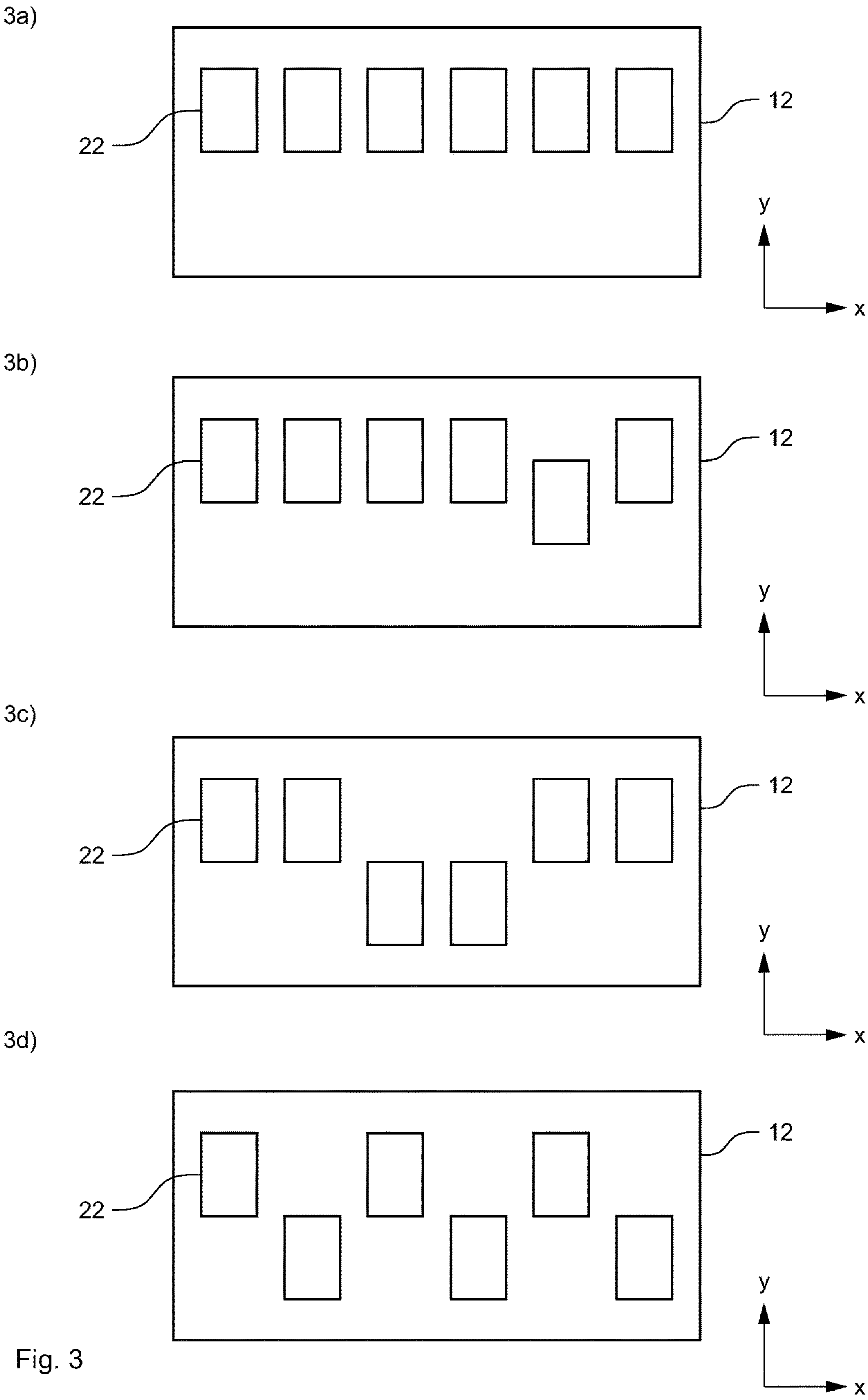
FIG. 3 is a schematic illustration of printhead carrier components according to printhead layouts according to corresponding examples.

Providing the printhead carrier component 12 at 110 may comprise selecting, from a plurality of types of predefined printhead carrier components, a type of printhead carrier component corresponding to a predefined printhead layout. FIG. 3 is a schematic illustration of printhead carrier components 12 corresponding to four different predefined printhead layouts according to different examples. Notably, the examples illustrated in FIG. 3 are not meant to be exhaustive and other configurations, in particular other printhead layouts, are possible. Although the examples schematically illustrated in FIG. 3 comprise six bays 22, printhead layouts according to other examples may comprise different numbers of bays 22, for example 2, 3, 4, 5, 6, 7, 8, 10, 12, 14, 16, 18 or 20 bays 22.

FIG. 3*a*) schematically illustrates a printhead carrier component 12 corresponding to a first predefined printhead layout, wherein all bays 22 are aligned in one direction (cf. Y-direction as represented in FIG. 3).

FIG. 3*b*) schematically illustrates a printhead carrier component 12 corresponding to a second predefined printhead layout similar to the printhead layout illustrated in FIG. 2, wherein all but one bays 22 are aligned with each other (in the Y-direction in FIG. 3), whereas one of the bays 22 is displaced from the other bays 22 in the Y-direction.

FIG. 3*c*) schematically illustrates a printhead carrier component 12 corresponding to a third predefined printhead layout, wherein the bays 22 are pairwise offset, such that a first pair of bays 22 is offset with respect to a neighboring pair of bays 22 and aligned with respect to a next-neighboring pair of bays 22, wherein “offset” or “aligned” may refer to a particular relative position (e.g., in the Y-direction in the example shown in FIG. 3).

FIG. 3*d*) schematically illustrates a printhead carrier component 12 corresponding to a fourth predefined printhead layout, wherein the individual bays 22 are arranged in an offset configuration, such that a first (upper) group of alternating bays 22 is displaced in a direction, in the example shown in the Y-direction, with respect to a second (lower) group of alternating bays 22.

In the examples shown in FIG. 3, each of the printhead layouts may differ from another one of the printhead layouts in a number of bays 22, an orientation of the bays and a position of the bays in at least one of the, X, Y and Z directions. As a consequence, when printheads are received in the bays 22 of printhead carrier components according to different printhead layouts, the number, position and arrangement of the printheads may be different for different printhead layouts. For example, although the examples shown in FIG. 3 show bays 22 arranged in one or two rows, printhead layouts according to other examples may comprise bays 22 arranged in three, four five or more rows, i.e. different sets of bays 22 mutually aligned in at least one of the X and Y directions.

Printhead layouts according to different examples may comprise bays 22 which are offset with respect to each other in at least one of the X and Y directions and which may overlap each other in one of the X or Y directions. For example, while bays 22 of the printhead layouts illustrated in FIGS. 3*c*) and 3*d*) are mutually offset in the Y-direction having no overlap in the Y-direction, the printhead layout illustrated in FIG. 3*b*) includes bays offset in the Y-direction and having an overlap in the Y-direction corresponding to approximately ½ of the extension of the bays 22 in the Y-direction.

According to some examples, a printhead layout may comprise at least one bay which is offset with respect to other bays in the X or Y direction and which overlaps with at least one other bay in said direction for 1/10, 1/6, ¼, ⅓ or ½ or ¾ of the length of the bays in said direction.

In some examples, the printhead carrier components 12 schematically illustrated in FIG. 3 according to different printhead layouts may be modular printhead carriers manufactured according to the corresponding printhead layout. The modular printhead carrier may then be employed as pre-manufactured modular printhead carriers of a modular kit for manufacturing a printhead carrier. Providing the printhead carrier component 12 may then comprise selecting a printhead carrier component 12 from a plurality of predefined types of printhead carrier component 12, for example based on selecting a corresponding printhead layout.

According to some examples, providing, at no, the printhead carrier component 12 may comprise selecting the predefined printhead layout from a plurality of predefined printhead layouts. For example, providing the printhead carrier component 12 may comprise forming, in particular 3-D printing, machining or molding the printhead carrier component 12 according to a predefined printhead layout selected from a plurality of predefined printhead layouts. For instance, a predefined printhead layout corresponding to the printhead layout schematically illustrated in FIG. 3*c*) may be selected, in 110, and a corresponding printhead carrier component may then be 3D-printed or molded, such that the bays 22 are arranged according to the selected printhead layout illustrated in FIG. 3*c*).

Figure 4:
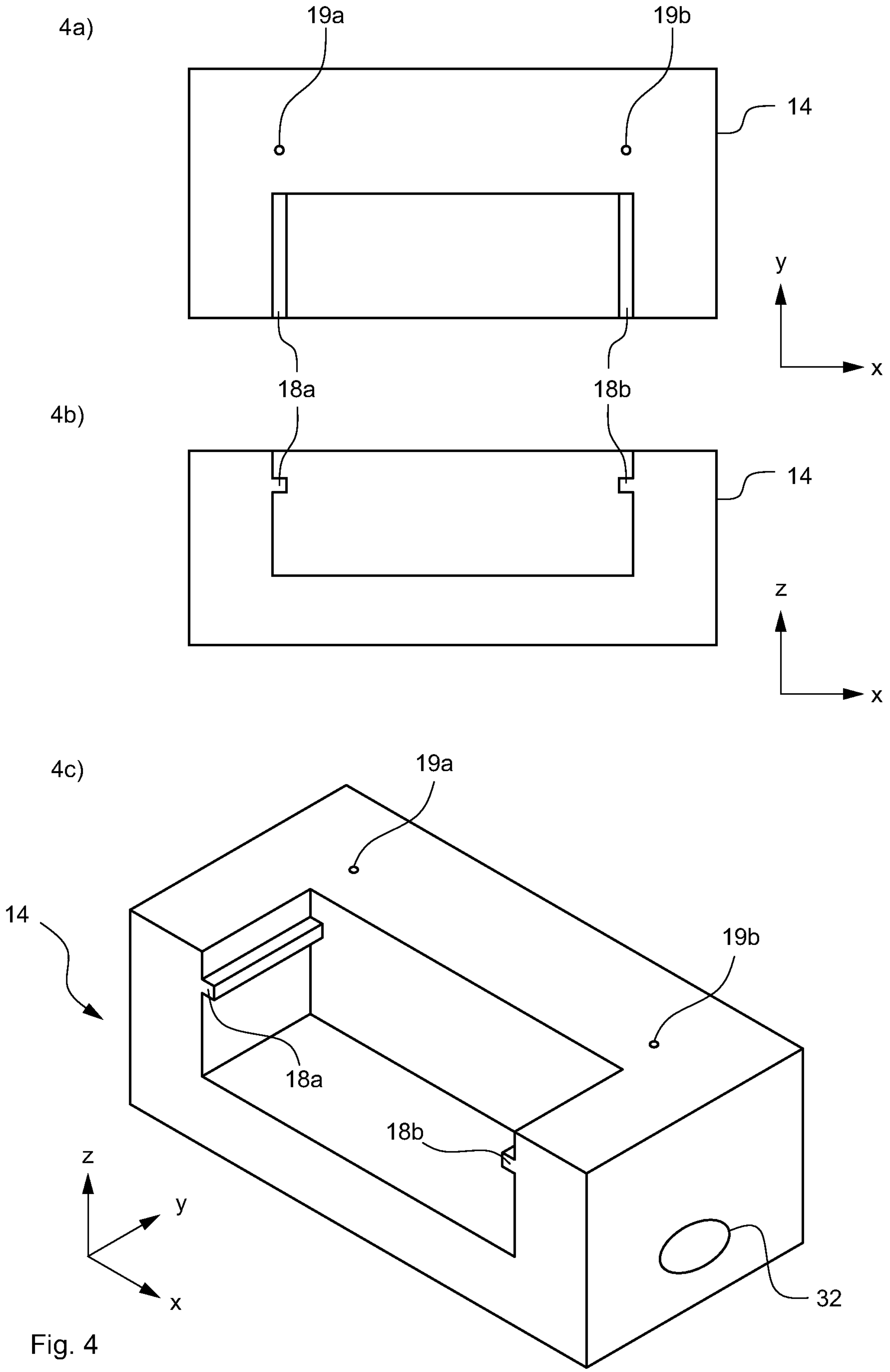
FIG. 4 is a schematic illustration of a frame component according to an example.

The method 100 illustrated in FIG. 1 further comprises, at 120, providing a frame component. FIG. 4 schematically illustrates a frame component 14 according to an example. FIGS. 4*a*), 4*b*) and 4*c*) respectively illustrate a top view in the XY-plane, a front view in the XZ-plane and a perspective view of the frame component 14. The frame component 14 may be adapted to receive the printhead carrier component 12. The printhead carrier component 12 may be attachable to the frame component 14.

The frame component 14 may be provided by 3D-printing, machining or molding the frame component 14. The frame component 14 and the printhead carrier component 12 may be formed using the same or different forming technologies. For example, both the printhead carrier component 12 and the frame component 14 may be molded. In other examples, the frame component 14 may be molded and the printhead carrier component may be 3D-printed.

The printhead carder component 12 and the frame component 14 may be distinct components and may be separately manufactured. Thus a process of providing, manufacturing or forming the printhead carrier component 12 may be independent from a process of providing, manufacturing or forming the frame component 14.

According to some examples, the printhead carrier component 12 and the frame component 14 may be manufactured of different materials, for instance materials with different flammability or different stiffness. The frame component may for example be of or comprise a Vo flammability material, wherein flammability is defined according to the UL 94 standard for safety of flammability of plastic materials for parts in devices and appliances testing, such as glass filled poly(p-phenylene oxide), PPO+GE. The printhead carrier component 12 may be of or comprise an HB flammability material, such as glass filled polyethylene terephthalate, PET+GE).

Since the printhead carrier component 12 and the frame component 14 may be separately manufactured, the manufacturing processes of the carrier component 12 and the frame component 14 may be adapted separately to individual requirements for the frame component 14 and the printhead carrier component 12, respectively. For example, the manufacturing processes of the carrier component 12 and the frame component 14 may be respectively adapted to the correspondingly required form and size precision and material tolerances. The frame component 14 may for example be formed, for instance molded, with a first form and size precision, for example having a manufacturing tolerance of around 0.08 mm with respect to any target dimension, whereas the printhead carrier component 12 may be formed, for instance 3D-printed, with a second form and size precision greater than the first form and size precision, for example having a manufacturing tolerance of around 0.05 mm with respect to any target dimension.

Further, since the printhead carrier component 12 may be smaller in size than the frame component 14, material tolerances in the printhead carrier component 12, Which may receive printheads, can be more easily controlled during a manufacturing process, for instance as compared to larger monolithic elements, in particular as compared to configurations in which, in a carriage, a printhead carrier component is integral with a frame component and possibly with further components to slidingly attach the carriage to a carriage rod.

According to some embodiments, a manufacturing process of the printhead carrier component 12 may comprise a machining sub-process, whereas a manufacturing process of the frame component 14 needs not comprise a machining sub-process. Since the printhead carrier component 12 and the frame component 14 may be separately manufactured with different techniques, precision-oriented sub-processes such as machining may be concentrated, during a manufacturing process of a printhead carrier, such as during method 100, on one of the components of the printhead carrier, for example on the printhead carrier component 12.

The method 100 then proceeds to 130, wherein the printhead carrier component 12 is attached to the frame component 14. Thus, the printhead carrier component 12 and the frame component 14 can be separately provided and then mutually attached to form a printer carriage to. The printhead carrier component 12 may be removably attached to the frame component 14, such that, when the printhead carrier component 12 is attached to the frame component 14, the printhead carrier component 12 can be detached from the frame component 14, for example by a user.

The printhead carrier component 12 may be positioned with respect to the frame component 14 by means of at least one registration elements, wherein the at least one registration elements register a position of the printhead carrier component 12 with respect to the frame component 14. In the examples schematically illustrated in FIGS. 2 and 4, the registration element comprises first and second molded pins 18*a*, 18*b* formed in the frame component 14 and first and second slots 16*a*, 16*b* formed in the printhead carrier component 12, wherein the first and second slots 16*a* and 16*b* can respectively receive the first and second molded pins 18*a* and 18*b* of the frame component 14, thereby registering the position of the printhead carrier component 12 with respect to the frame component 14.

The registration element may additionally or alternatively comprise at least one of a molded pin and a slot for receiving the molded pin, a machined pin and a slot for receiving the machined pin, and a sacrificial rib and a slot for receiving the sacrificial rib. Although in the example schematically illustrated in FIGS. 2 and 4 the molded pins 18*a* and 18*b* are formed in the frame component 14 and extend in the Y-direction, whereas the slots 16*a* and 16*b* are formed in the printhead carrier component 12 extending also in the Y-direction, in other examples, at least one registration elements may be formed in the printhead carrier component or in the frame component 14 and may extend in at least one of the X-direction, the Y-direction and the Z-direction.

The printhead carrier component 12 may hence be received in the frame component 14 and registered in a predetermined position by at least one registration elements, thereby forming a printhead carrier 10 formed by the printhead carrier component 12 and the frame component 14.

According to some examples, the printer carriage 10 may further comprise at least one attachment elements to attach the printhead carrier component 12 to the frame component 14. The attachment element may allow fixing a position of the printhead carrier component 12 with respect to the frame component 14, for example a position registered by the at least one registration element.

The at least one attachment elements may comprise at least one removable attachment element to removably attach the printhead carrier component 12 to the frame component 14. The at least one removable attachment element may allow, when the printhead carrier component 12 is attached to the frame component 14, detaching the printhead carrier component 12 from the frame component 14, for example to replace the printhead carrier component 12 by a different printhead carrier component corresponding to a different printhead layout or at least one fix attachment elements. The at least one attachment element may be arranged in at least one of the frame component 14 and the printhead carrier component 12.

The at least one removable attachment elements may be or comprise tool-operated attachment elements, such as screws and screw-holes. Additionally or alternatively, the at least one attachment element may comprise at least one fix attachment elements to fix the printhead carrier component 12 to the frame component 14, wherein the at least one fix attachment element may comprise at least one of a glue, a solder element, a snap connection or the like. The printhead carrier component 12 may thus be fixed to the frame component 14 by at least one of gluing, welding and snapping, and may be removably attached to the frame component, for example by screwing.

In the examples schematically illustrated in FIGS. 2 and 4, the at least one attachment element comprises a first opening 17*a* and a second opening 17*b* formed in the printhead carrier component 12, as shown in FIG. 2*b*) and FIG. 2*c*), as well as a first frame opening 19*a* and a second frame opening 19*b*, as shown in FIGS. 4*a*) and 4*c*). The frame openings 19*a* and 19*b* may overlap the openings 17*a* and 17*b* when the printhead carrier components 12 is received in the frame component 14 and positioned with respect to the frame component 14 as determined by the at least one registration element, for example as determined by the molded pins 18*a* and 18*b* and the slots 16*a* and 16*b*.

The openings 17*a* and 17*b*, 19*a* and 19*b* may allow removably attaching the printhead carrier component 12 to the frame component 14 by means of tool-operated attachment elements, such as screws, bolts or the like, which can be inserted in the first opening 17*a* and the first frame opening 19*a* overlapped by the first opening 17*a* and in the second opening 17*b* and the second frame opening 19*b* overlapped by the first opening 17*b*, thereby fixing a position of the printhead carrier component 12 with respect to the frame component, when the printhead carrier component 12 is registered with respect to the frame component 14.

Although, in the examples schematically illustrated in FIGS. 2 and 4, two attachment elements are shown, which attach the printhead carrier component 12 to the frame component 14 at two respective attachment positions, the first attachment element formed by the openings 17*a* and 19*a* and by the corresponding screw and the second attachment element formed by the openings 17*b* and 19*b* and by the corresponding screw, the printer carriage formed by the printhead carrier component 12 and the frame component 14 may comprise any larger number of attachment elements, for example 3, 4, 5 or more attachment elements, for example removable attachment elements, such as screws, or just one attachment element to attach the printhead carrier component 12 to the frame component 14 at, respectively, 1, 3, 4, 5 or more attachment positions.

According to some examples, using three attachment elements, for example three tool-operated attachment elements such as screws or bolts, the printhead carrier component 12 may be attached to the frame component 14 at three attachment positions. This may allow fixing a position of the printhead carrier component 12 with respect to the frame component 14 while minimizing mechanical stress. According to other examples, using higher numbers of attachment elements, for example 5, may allow achieving a more rigid attachment between the printhead carrier components 12 and the frame component 14.

Figure 5:
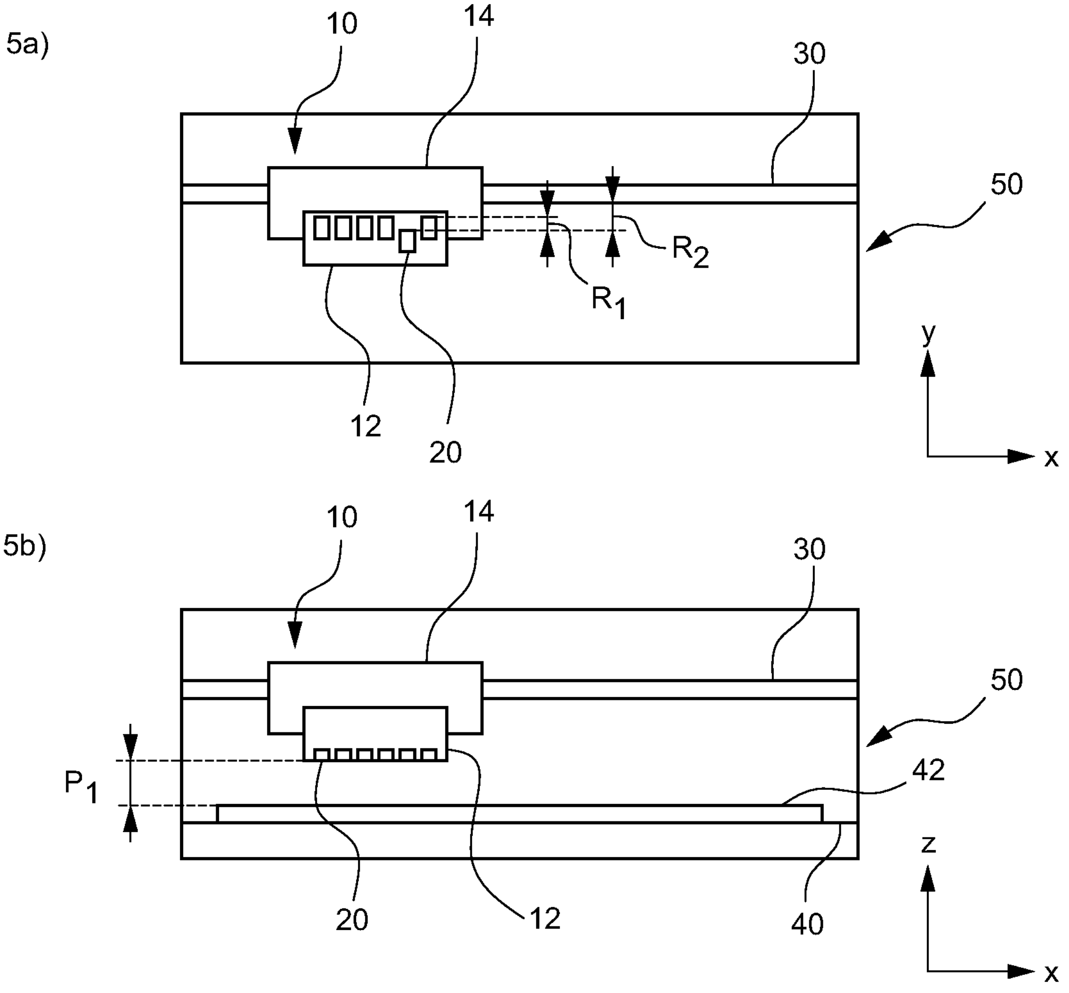
FIG. 5 is a schematic illustration of a printing device according to an example.

FIG. 5 schematically illustrates a printing device 50 comprising a printer carriage 10 manufactured from a modular kit, wherein the printer carriage to comprises a modular printhead carrier component and a frame component 14. FIG. 5*a*) represents a cross-sectional bottom view of the printing device 50 in the XY-plane, wherein the bottom part of the printheads received in the printhead carrier component 12 can be seen from the perspective of a print medium, for example a paper, to be printed. FIG. 5*b*) represents a front view of the printing device 50 in the XZ-plane.

The modular kit may comprise a first modular printhead carrier component 12 to receive a plurality of printheads 20 according to a first predefined printhead layout. The first modular printhead carrier component 12 may be removably attachable to the frame component 14. The first printhead carrier component 12 may comprise a plurality of bays 22 to receive printheads 20 according to one of the printhead layouts schematically illustrated in FIG. 3, for example according to the printhead layout illustrated in FIG. 3*c*).

The first modular printhead carrier 12 may be registered with respect to the frame component by a first registration element of the first modular printhead carrier 12, which may be received by a mating registration element of the frame component 14. The first registration element may for example correspond to the previously described slots 16*a* and 16*b* (cf. FIG. 2), and the mating registration element may correspond to the previously described pins 18*a* and 18*b* (cf. FIG. 4). The first modular printhead carrier 12 may further be removably attached to the frame component 14 by means of at least one removable attachment element, for example by means of at least one screw.

The modular kit may further comprise a second modular printhead carrier component (not shown in FIG. 5) to receive a plurality of printheads 20 according to a second predefined printhead layout. The second modular printhead carrier component may be removably attachable to the frame component. The second printhead carrier component may comprise a plurality of bays 22 to receive printheads 20 according to one of the printhead layouts schematically illustrated in FIG. 3 different from the first printhead layout, for example according to the printhead layout illustrated in FIG. 3*d*.

The second modular printhead carrier may be registered with respect to the frame component by a second registration element of the second modular printhead carrier, which may be received by the mating registration element of the frame component 14. The first registration element may for example correspond to slots, similar to the previously described slots 16*a* and 16*b* (cf. FIG. 2). The second modular printhead carrier may be removably attached to the frame component 14 by means of at least one removable attachment element, for example by means of at least one screw.

The mating registration element may allow registering a position of any of the first modular printhead carrier component and the second modular printhead carrier component with respect to the frame component, such that any of the first modular printhead carrier component and the second modular printhead carrier component can be received in the frame component using the mating registration element and a corresponding one of the first registration element and the second registration element.

Each of the first modular printhead carrier component and the second modular printhead carrier component may implement a different printhead layout by comprising a plurality of bays 22 to receive printheads according to a corresponding printhead layout.

When the first modular printhead carrier component 12 is attached to the frame component 14 as shown in FIG. 5, a plurality of printheads 20 may be received in the plurality of bays 22 of the first modular printhead carrier component 12. The printheads 20 received in the first printhead carrier component 12 may be arranged at a first distance from a reference position. The reference position may be a defined as a reference position at the printing device 50, and the first distance may hence be a distance between a defined point of the printer carriage to or a printhead 20 received in the printhead carriage 10 and the aforesaid reference position.

For example, FIG. 5*a*) schematically illustrates a printing device 50 in which the printer carriage 10 including the frame component 14, is movably attached to a printing rod 30 to guide a movement of the printer carriage 10 in the X-direction. In the example shown, the printer rod 30 guides a movement of the printer carriage 10 in the X-direction. The printer carriage may be attached to the printing rod 30 by means of a printing rod opening 32 to receive the printer rod 30 formed in the frame component 14, an example of which is schematically shown in FIG. 4*c*).

When the first modular printhead carrier 12 is attached to the frame component 14, as shown in FIG. 5, at least one of the printheads 20 received in the bays 22 of the first printhead carrier component 12 may be at a first distance $R_1$ from the printer rod 30 in a direction perpendicular to the printer rod 30 (cf. Y-direction in FIG. 5*a*), which in the example shown corresponds to a print medium advance direction). At least one other printhead received in the first printhead carrier 12 may be at a different first distance $R_2$ from the reference position, for example at a distance $R_2$ from the printer rod 30 in the Y-direction. The aforesaid distance from the reference position may hence be a printhead-to-rod distance.

When the second modular printhead carrier is attached to the frame component 14 (not shown in FIG. 5), at least one of the printheads 20 received in the bays of the second printhead carrier component may be at a second distance from the reference position different from the first distance $R_1$ or $R_2$, for example at a second distance from the printing rod 30.

The aforesaid reference position may correspond to other distances defined in a printing device 50, for example to a distance between at least one of the printheads and a print medium, i.e. a so-called printhead-to-paper distance. FIG. 5*b*) shows a schematic front view of the printing device 50 shown in FIG. 5*a* and illustrates another example of a first distance from a reference position.

As shown in FIG. 5*b*, printheads received in the first modular printhead carrier component 12 according to the first printhead layout may be at a first distance P, from a position of a print medium 42, when the first modular printhead carrier 12 is attached to the frame component 14.

The print medium 42 may be supported by a print medium carrier 40, such that a combined advance movement of the print medium 42 in a printing direction, which in the example shown may coincide with the Y-direction, and a printhead movement of the printhead carrier in the direction defined by the printing rod 30, which in the example shown coincides with the X-direction, the printhead carrier 10 may allow printing the entire surface of a print medium 42, for example by ejecting a printing fluid, such as ink, through nozzles of the printheads 20. The print medium 42 may for example comprise paper, cardboard or linen.

Printheads received in the second modular printhead carrier component according to the second printhead layout may be at a second distance from the position of the print medium 42, when the second modular printhead carrier 12 is attached to the frame component 14, wherein the second distance may be different from the first distance P1.

By means of the different distances to the print medium 42, printheads received in the first and second printhead carrier component, which are respectively arranged according to the first and second printhead layouts, may implement different printing settings. For example, if a first distance corresponding to a first target printhead-to-paper distance of the first printhead layout is smaller than a second distance corresponding to a second target printhead-to-paper distance of the second printhead layout, the first modular printhead carrier component may be suitable for printing on a thinner print medium 42 having a smaller thickness in the Z-direction. As another example, different printhead configurations, for instance printhead layouts for different ink types, color spectrum, additional pretreatment and/or posttreatment fluids, may be implemented by different printhead layouts. Different printhead layouts may comprise bays 22 to receive printheads in different relative positions of printheads in the XY plane, as shown in FIGS. 3*a*) to 3*d*) for example, different printhead pitches and/or different printhead positions in the Z direction.

Thus, different settings of a printer carriage, for example a number and arrangement of printheads, a printhead-to-rod distance and a printhead-to-paper distance, may be selected during manufacturing of the printer carriage using the modular kit by correspondingly selecting a printhead layout or a modular printhead carrier component according to a selected printhead layout and attaching the selected printhead carrier component, for example the first modular printhead carrier component 12 or the second modular printhead carrier component (not shown) to the frame component 14 to thereby form the printer carriage to.

According to some examples, each of the first modular printhead carrier component 12 and the second modular printhead carrier component (not shown) may be removably attachable to the frame component 14 by means of at least one removable attachment element. The at least one removable attachment element may allow removably attaching a respective one of the first and second modular printhead carrier components to the frame component 14. The first modular printhead carrier component 12 may be removably attached to the frame component 14, for example by means of one, two, three, four or five screws.

In order to reconfigure the printhead carriage for printing with different settings or according to a different printhead layout, it may hence be possible to detach the first modular printhead carrier component 12 from the frame component 14 and to removably attach to the frame component 14 the second modular printhead carrier component or another modular printhead carrier component, thereby replacing the first printhead carrier component 12 by the second modular printhead carrier component or by said another modular printhead carrier. The second modular printhead carrier component or said another modular printhead carrier component may then be removably attached to the frame component 14 by means of the at least one removable attachment element.

According to some examples, the aforesaid different settings of the printer carriage may be differently selected within corresponding parameter ranges determined by the frame component. The frame component may determine at least one of a maximal number of printheads, a maximal printhead-to-rod distance and a maximal printhead-to-paper distance. For example, a first frame component may be compatible with printhead carrier components comprising at most six bays 22 to receive at most six printheads 20 arranged in at most two rows of bays 22, whereas a second frame component may be compatible with printhead carrier components comprising at most twelve bays 22 to receive at most twelve printheads 20 arranged in at most three rows of bays 22.

When printheads are received in a modular printhead carrier component, the printheads may be fluidly connected to a print fluid reservoir to receive a print fluid from the print fluid reservoir to be ejected upon the print medium 42 during a printing process. According to some examples, the print fluid reservoir may be independent from the printer carriage, such that the printer carriage may be movable without the print fluid reservoir. The print fluid reservoir may for example be received in a part of a printing device different from the printer carriage.

Although reference is made herein to a first modular printhead carrier component and to a second modular printhead carrier component, the modular kit may comprise any larger number of modular printhead carriers, such as 3, 4, 5, 6 or 10 modular printhead carrier components. Each modular printhead carrier component may receive a corresponding plurality of printheads according to a different predefined printhead layout, possibly comprising different numbers and arrangement of printheads, and may define different distances from a reference position, such as printhead-to-rod distances and printhead-to-paper distances, as compared to the other modular printhead carriers of the modular kit.

Since the printhead carrier component 12 and the frame component 14 can be distinct components, which can be separately manufactured, attaching the printhead carrier component 12 to the frame component 14 can be postponed in a manufacturing process of a printing device to an assembling phase of the manufacturing process. The printhead layout of the printhead carrier component 12 can then be selected to match a given predefined printhead layout, for example a predefined printhead layout for a corresponding printing device model, which may be chosen from a plurality of predefined printhead layouts, wherein each predefined printhead layout may correspond to a respective printing device model. A modular construction is thereby provided that allows an improved layout flexibility in a manufacturing process.

The invention claimed is:

1. A method of manufacturing a printer carriage, the method comprising:

providing a first printhead carrier component to receive a plurality of first printheads according to a predefined printhead layout;

providing a frame component;

attaching the first printhead carrier component to the frame component, wherein the first printhead carrier component and the frame component are separately manufactured, wherein the plurality of first printheads are disposed at a first distance from a print medium carrier when the first printhead carrier component is attached to the frame component;

removing the first printhead carrier component from the frame component; and attaching a second printhead carrier component to the frame component, wherein a plurality of second printhead supported by the second printhead carrier component are disposed at a second distance from the print medium carrier when the second printhead carrier component is attached to the frame component, wherein the first distance is different from the second distance.

2. The method of claim 1, wherein providing the first printhead carrier component comprises selecting, from a plurality of predefined printhead carrier components, a printhead carrier component corresponding to the predefined printhead layout.

3. The method of claim 1, wherein providing the first printhead carrier component comprises at least one of 3D-printing, machining and molding the printhead carrier component.

4. The method of claim 1, wherein providing the frame component comprises at least one of 3D-printing, machining and molding the frame component.

5. The method of claim 1, further comprising selecting the predefined printhead layout from a plurality of predefined printhead layouts.

6. The method of claim 1, wherein the frame component and the first printhead carrier component are manufactured of different materials.

7. A printer carriage comprising:

a frame component, and a first printhead carrier component attachable to the frame component, the first printhead carrier component including a plurality of bays to receive a corresponding plurality of first printheads, wherein the plurality of bays are arranged according to a predetermined printhead layout, wherein the frame component and the first printhead carrier component are distinct components, and further wherein the plurality of first printheads are disposed at a first distance from a print medium carrier when the first printhead carrier component is attached to the frame component; and a second printhead carrier component attachable to the frame component, wherein a plurality of second printhead supported by the second printhead carrier component are disposed at a second distance from the print medium carrier when the second printhead carrier component is attached to the frame component, wherein the first distance is different from the second distance.

8. The printer carriage of claim 7, wherein the first printhead carrier component is attached to the frame component by at least one attachment element.

9. The printer carriage of claim 8, wherein the at least one attachment element comprises three, four, five or more removable attachment elements to removably attach the first printhead carrier component at respective attachment positions.

10. The printer carriage of claim 8, wherein the at least one attachment element comprises at least one tool-operated attachment element to removably attach the first printhead carrier component to the frame component.

11. The printer carriage of claim 7, further comprising a registration element to register a position of the first printhead carrier component with respect to the frame component.

12. The printer carriage of claim 11, wherein the registration element comprises at least one of a molded pin and a slot for receiving the molded pin, a machined pin and a slot for receiving the machined pin, and a sacrificial rib and a slot for receiving the sacrificial rib.

13. A modular kit for manufacturing a printer carriage, the modular kit comprising:

a first modular printhead carrier component to receive a first plurality of printheads according to a first predefined printhead layout;

a second modular printhead carrier component to receive a second plurality of printheads according to a second predefined printhead layout, different from the first predefined printhead layout; and an independent frame component that is attachable to the first modular printhead carrier component and the second modular printhead carrier component, wherein each of the first modular printhead carrier component and the second modular printhead carrier component is removably attachable to the independent frame component by at least one removable attachment element to removably attach a respective one of the first and second modular printhead carrier components to the independent frame component, wherein the first plurality of printhead is disposed at a first distance from a print medium carrier when the first modular printhead carrier component is attached to the independent frame component, and wherein a second plurality of printhead supported by the second printhead carrier component are disposed at a second distance from the print medium carrier when the second modular printhead carrier component is attached to the independent frame component, wherein the first distance is different from the second distance.

14. The modular kit of claim 13, wherein when the first modular printhead carrier component is attached to the independent frame component, at least one of the first plurality of printheads received in the first modular printhead carrier component are at a third distance from a reference position, and when the second modular printhead carrier component is attached to the frame component, at least one of the second plurality of printheads, that are received in the second printhead carrier component, are at a fourth distance from the reference position, wherein the third distance is different from the fourth distance.

15. The modular kit of claim 13, wherein the first predefined printhead layout differs from the second predefined printhead layout in at least one of a number of the printheads to be received, an orientation of the printheads to be received and a position of the printheads in at least one of X, Y and Z directions.

* * * * *